(No Model.)
C. B. HOPKINS.
DRINK STRAINER.
No. 384,977. Patented June 26, 1888.
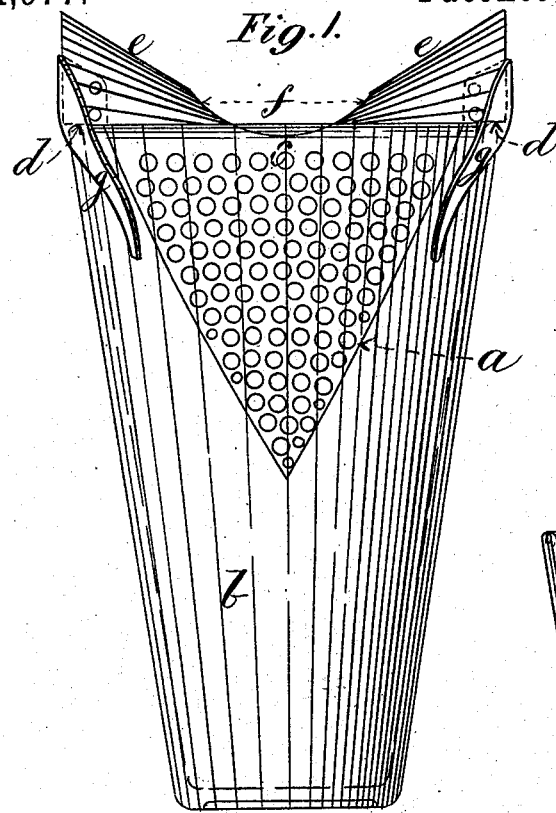
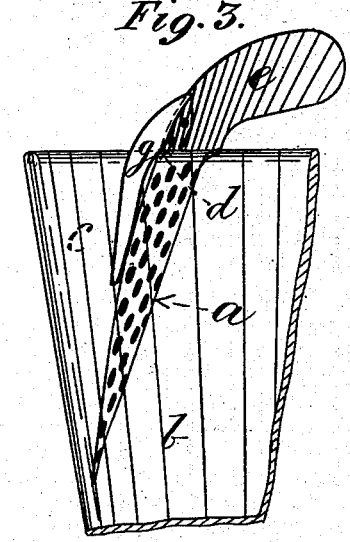
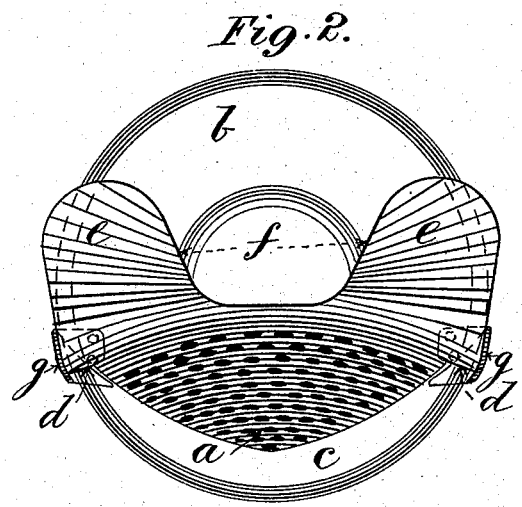
WITNESSES.
S. L. Schrader
Paul Bakewell
INVENTOR.
Cabel B. Hopkins

UNITED STATES PATENT OFFICE.

CABEL B. HOPKINS, OF LOUISVILLE, KENTUCKY.

DRINK-STRAINER.

SPECIFICATION forming part of Letters Patent No. 384,977, dated June 26, 1888.

Application filed October 17, 1887. Serial No. 252,586. (No model.)

*To all whom it may concern:*

Be it known that I, CABEL B. HOPKINS, a citizen of the United States, residing at the city of Louisville, county of Jefferson, State of Kentucky, have invented a certain new and useful Improvement in Drink-Strainers, of which the following is a full, clear, and exact description.

My present invention relates to that class of detachable strainers to be used in connection with glasses, drinking-cups, and other vessels wherein iced teas, cocktails, lemonades, &c., are made or served; and it consists, generally stated, in a strainer having a perforated triangular or segmental section adapted to dip or descend into the vessel, in conjunction with flaring or receding wing-sections adapted to protect the face and mustache, substantially as will hereinafter more fully appear, and also, in conjunction with said features, of spring-clips arranged substantially parallel with the edges of the strainer-section and which are adapted to project down upon and clasp the outer surface of the glass cup or like vessel, so that the strainer shall form with the cup a segmental chamber to which only the clear or strained liquid can obtain access.

I will now proceed to describe my invention, so that others skilled in the art to which it appertains may make and use the same.

On the accompanying drawings, Figure 1 is a front elevation of my improved drink-strainer applied to a glass; Fig. 2, a plan of the same, and Fig. 3 a side elevation thereof with the glass broken away.

Like letters of reference denote like parts in all the figures.

*a* represents my improved drink-strainer, which is perforated and specially formed triangle-wise for setting against the inside of the glass *b* and to dip or descend therein, so as to inclose within the latter a segmental chamber, *c*, for receiving the strained liquid. The upper portion of the strainer *a* is formed on each side with an offset, *d*, which sets on and projects slightly beyond the upper rim or edge of the glass *b*, and with a curved receding wing or flange, *e*, a space, *f*, occurring between the two wings *e*.

To the outside edges of the wings *e*, adjacent to the offsets *d*, are attached spring clips or ears *g*, of any desired shape, which extend in the same direction as, and parallel, or thereabout, with the side edges of the strainer *a*, and normally tend to spring inward toward the said edges. The strainer *a* being inserted within the glass *b*, so that the spring clips or ears *g* are passed over the upper rim or edge of the glass *b*, and the strainer *a* being then pushed down and adjusted to its proper inclination against the inside of the glass *b*, (see particularly Fig. 3,) it will be retained in that position by the spring clips or ears *g* pressing against the outside of the glass *b*.

In using the strainer *a*, the mouth of the drinker being applied to that portion of the rim of the glass *b* bounding the chamber *c*, the nose will occupy the space *f* between the wings *e*, which protect the mustache, and the iced drink on the other side of the strainer *a*, passing through the perforations in the latter, can then be drunk freely from the chamber *c*; or, on the other hand, the contents of the glass *b* may be poured through the strainer *a*, and from the chamber *c* into another glass, as desired.

I claim—

1. A drink-strainer having the triangular perforated section *a* and the flaring wings *e e*, substantially as and for the purposes specified.

2. A drink-strainer having the triangular perforated section *a*, the flaring wings *e e*, and the spring-clips *g g*, which extend in the same direction and substantially parallel with the edges of the triangular perforated section *a*, substantially as and for the purposes specified.

In testimony whereof I affix my signature, in presence of two witnesses, this 1st day of October, 1887.

CABEL B. HOPKINS.

Witnesses:
D. P. CURRY,
E. P. WALSH.